United States Patent [19]

Causey

[11] Patent Number: 4,936,042
[45] Date of Patent: Jun. 26, 1990

[54] FLASHER FOR USE IN TROLLED FISH LURE ASSEMBLIES

[76] Inventor: George B. Causey, 1322 Hampton Way, Woodburn, Oreg. 97071

[21] Appl. No.: 358,608

[22] Filed: May 30, 1989

[51] Int. Cl.⁵ .................................... A01K 85/00
[52] U.S. Cl. ............................. 43/42.16; 43/42.46; 43/42.47
[58] Field of Search ............... 43/42.16, 43.12, 43.15, 43/42.32, 42.35, 42.46, 42.47, 27.2, 27.4

[56] References Cited

U.S. PATENT DOCUMENTS

| | | | |
|---|---|---|---|
| D. 237,177 | 10/1975 | Morrell | 22/27 |
| 1,808,416 | 5/1931 | Raymond | 43/42.32 |
| 1,870,767 | 8/1932 | Brown . | |
| 2,637,134 | 5/1953 | Davidson | 43/42.32 |
| 2,665,516 | 1/1954 | Race | 43/12.51 |
| 3,174,247 | 3/1965 | Morgan | 43/42.16 |
| 3,656,253 | 4/1972 | Gaunt | 43/42.33 |
| 4,122,624 | 10/1978 | Smith | 43/42.33 |
| 4,201,006 | 5/1980 | Wetherald | 43/42.06 |
| 4,307,531 | 12/1981 | Honse | 43/42.32 |

Primary Examiner—Richard K. Seidel
Assistant Examiner—James Miner
Attorney, Agent, or Firm—Eugene D. Farley

[57] ABSTRACT

A flasher for use in trolled fish lure assemblies comprises an elongated flat strip of sheet metal or other structural material having a bright, highly reflective surface formed into a spiral configuration which imparts a spiral motion to the flasher as it is trolled through the water.

9 Claims, 1 Drawing Sheet

U.S. Patent
Jun. 26, 1990
4,936,042
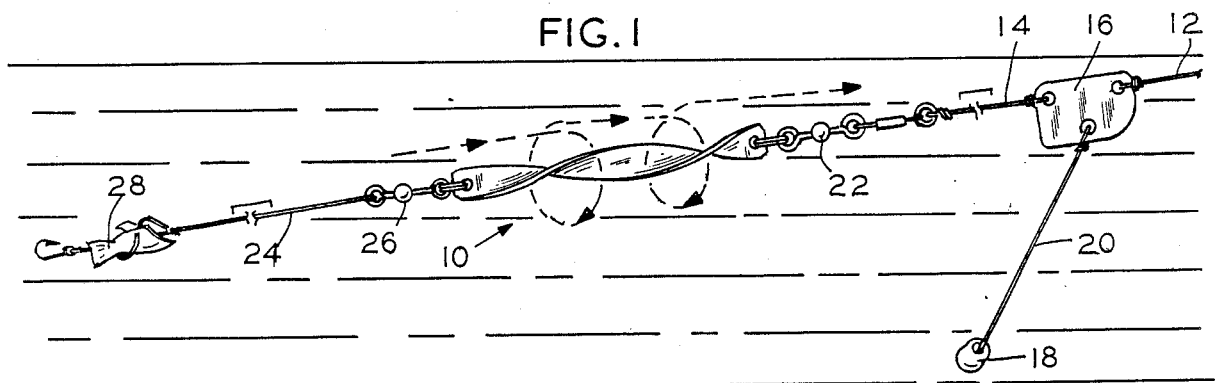
FIG. 1
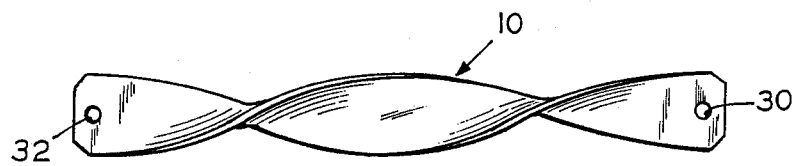
FIG. 2
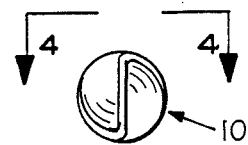
FIG. 3
FIG. 4
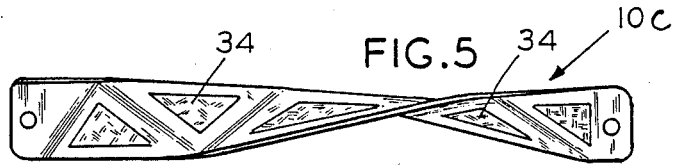
FIG. 5
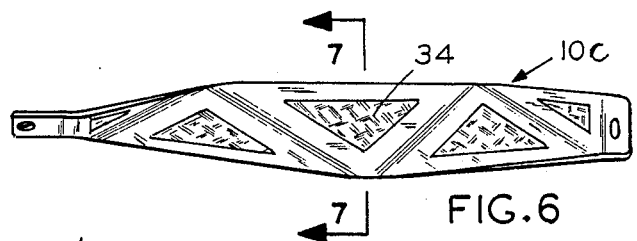
FIG. 6
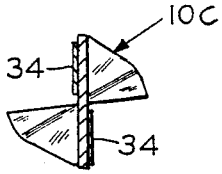
FIG. 7
FIG. 8

FLASHER FOR USE IN TROLLED FISH LURE ASSEMBLIES

This invention relates to flashers for use in trolled fish lure assemblies.

BACKGROUND AND GENERAL STATEMENT OF THE INVENTION

A fishing assembly widely used for deep trolling at depths of 20 to 80 feet or more, particularly for salmon in the Pacific Northwest, comprises a flasher having one of its ends attached to a weighted trolling line and the other of its ends attached to one end of a leader having a length of 2 to 3 feet. The herring bait, spoon, plug, or other fishing lure is attached to the other end of the leader.

The flasher normally has a length of 6 to 20 inches. Its purpose is two-fold: First, to create a glitter in the water which attracts fish and, second, to impart an irregular motion to the lure which makes its movement resemble more closely the motion of a crippled herring as it moves through the water.

The conventional flashers comprise flat units of stainless steel or other highly reflective metal bent fore and aft to provide flat segments. This configuration causes the flasher to move in great loops, arcs, or zig-zag runs of substantial extent as it is drawn through the water.

It is the general purpose of the present invention to provide a flasher of the class described, but one which has a spiral configuration and accordingly spirals through the water as it is trolled behind the fishing boat. It accordingly has several advantages:

First, its reflective surface is displayed sequentially and in its entirety to the entire viewing areas as the flasher spirals through the water.

Second, it directs the attention of the fish to the lure immediately following.

Third, it does not yank the lure away from the fish whose interest has been attracted, as do the prior art flat flashers as they describe their major convolutions.

Fourth, it is sensitive in its response to the trolling speed, being effective even at very slow trolling speeds.

Fifth, in use, its action does not tend to foul the line.

Sixth, it retains its effectiveness over a long service life in that it does not fatigue, but keeps its shape.

Seventh, it is easy and economical to make in a variety of configurations.

The foregoing and other objects of the present invention are achieved by the provision of a flasher which, in its broad aspect, comprises an elongated, flat strip of structural material bent or formed into a spiral configuration, having a bright, highly reflective surface. The spiral may be either a continuous spiral, or one formed by a plurality of integral flat segments bent angularly into a spiral configuration.

First attaching means are present on the forward end of the flasher for attachment to a fishing line, usually through a swivel. Second attaching means are present on the rearward end of the flasher for attachment to the leader which trails the lure, also usually through a swivel.

A weight of predetermined value is attached to the fishing line for submerging the assembly to the desired depth.

As a result, as the assembly is drawn through the water, the flasher is driven in a spiral rotation which is attractive to fish, and directs them to the trailed bait.

THE DRAWINGS

In the drawings:

FIG. 1 is a view in elevation of a trolled fish lure assembly as it is drawn through the water, incorporating the herein described flasher in one of its embodiments.

FIG. 2 is an enlarged, detailed, elevational view of the flasher component of the assembly of FIG. 1, in a 360 degree spiral example.

FIG. 3 is an end view of the flasher of FIG. 2.

FIG. 4 is a view in elevation of the flasher of FIG. 2, but looking in the direction of view lines 4—4 of FIG. 3.

FIGS. 5 and 6 are views in side elevation of the flasher in a second embodiment, comprising integral, angularly arranged flat segments, rather than a continuous spiral, but in a 180 degree overall spiral configuration.

FIG. 7 is a transverse sectional view taken along line 7—7 of FIG. 6.

FIG. 8 is a view similar to FIGS. 5 and 6, but illustrating the second embodiment in an approximately 135° spiral configuration.

DESCRIPTION OF SPECIFIC EMBODIMENTS OF THE INVENTION

As illustrated in FIG. 1, the herein described flasher, indicated generally at 10, is adapted for use in a trolled fish lure assembly comprising, together with the flasher, a trolling line, a leader, and a bait or lure.

The trolling line may be employed in two segments 12, 14 in order to include a divider 16 by means of which a sinker or weight 18 is attached by a line 20.

Trolling line segment 14 is attached to the leading or forward end of flasher 10 by means of swivel 22.

The forward end of leader 24 is attached to the rearward end of flasher 10 by means of swivel 26.

Bait 28 is attached to the trailing end of the leader. When fishing for salmon, the bait commonly comprises a spoon, a plug, or, in the illustration, a plug-cut herring.

Flasher 10 may assume a diversity of configurations. All are characterized, however, by a spiral shape of varying degrees of tightness. For the purposes of the invention, the spiral when viewed endwise may have a spiral configuration of, broadly, 45 to 720 degrees, preferably from 90 to 360 degrees for the flasher of average length.

The spiral shape is achieved by bending or forming an elongated flat piece of metal, plastic, or other material in a desired manner. It thus may comprise a flat elongated piece of shiny metal twisted into a continuous spiral.

In the illustration of FIGS. 2, 3, and 4 the spiral, when viewed endwise, has a degree of continuous spiraling of 360 degrees.

Attaching means are provided at the leading and trailing ends of the flasher for attaching the flasher, respectively, to trolling line segment 14 through swivel 22 and to leader 24 through swivel 26. The means employed for this purpose simply comprise perforations or openings 30, 32.

Thus, as illustrated in the drawings, the fish lure assembly of my invention comprises in combination:

First and second swivel means 22, 26 having front and rear ends, the front end of the first swivel means being attached to the fish line.

A flasher 10 has front and rear ends and has on its front end first connecting means 30 for connecting it to the rear end of the first swivel means 22 and on its rear end second connecting means 32 for connecting it to the front end of the second swivel means 26.

The flasher comprises an elongated flat unit of structural material bent or formed into a spiral configuration having a bright reflecting surface.

A leader 24 having front and rear ends, has its front end attached to the rear end of the second swivel means.

A fish hook is attached to the rear end of the leader.

The reflective flasher 10 by virtue of its connection to the swivel means 22, 26 is free to rotate, and thus to serve its fish-attracting function, independently of the fishing line 12, 14 and the leader 24.

the embodiments of FIGS. 5–8 inclusive are similar, except with respect to the degree and contour of spiraling.

Thus in FIGS. 5 and 6, a flasher 10c is illustrated in elevational views disposed at 90 degrees to each other, the flasher being in the form of integral, angularly disposed flat segments having a degree of spiraling, as viewed endwise, of 180 degrees.

The embodiment of FIG. 8 is similar, the degree of spiraling of the unit 10d being about 135 degrees.

It is a feature of the invention that it is adaptable to the inclusion of one or more laminae on the flasher body of a highly colored and highly reflective material, such as metalized plastic film laminae 34. These may be colored in any desired color to suit the fancy of the fish (or the fisherman) and are affixed by means of a suitable, water resistant adhesive.

OPERATION

In use, the herein described flasher is incorporated in the trolled fishing assembly in the manner illustrated in FIG. 1. The assembly is trolled at the desired depth as determined by the magnitude of weight 18 and the speed of trolling. Weight 18 may have a value of from a few ounces to a pound or two and the depth at which bait 28 is trolled may vary from a few feet to as much as 60 to 80 feet below the surface.

As the assembly is drawn through the water, flasher 10 is activated and moves in spiral fashion so that all areas of its bright, highly reflective surface are displayed to the fish. This attracts the fish to bait 28, which is directly behind the flasher.

Having thus described in detail a preferred embodiment of the present invention, it will be apparent to those skilled in the art that various physical changes may be made in the invention described without altering the inventive concepts and principles embodied. The present embodiment is therefore to be considered as illustrative and not restrictive, the scope of the invention being indicated by the appended claims.

I claim:

1. For attachment to a fishing line (12, 14) a fish lure assembly comprising in combination:
    (a) first and second swivel means (22, 26) having front and rear ends, the front end of the first swivel means being attached to the fish line,
    (b) a flasher (10) having front and rear ends and having on its front end first connecting means (30) for connecting it to the rear end of the first swivel means (22) and on its rear end second connecting means (32) for connecting it to the front end of the second swivel means (26),
    (c) the flasher comprising an elongated flat unit of structural material bent or formed into a spiral configuration and having a bright, reflecting surface,
    (d) a leader (24) having front and rear ends,
    (e) the front end of the leader being attached to the rear end of the second swivel means, and
    (f) a fish hook attached to the rear end of the leader, whereby the reflective flasher (10) by virtue of its connection to the swivel means (22, 26) is free to rotate, and thus to serve its fish-attracting function, independently of the fishing line (12, 14) and the leader (24).

2. The lure assembly of claim 1 wherein the flasher is bent or formed into a continuous spiral.

3. The lure assembly of claim 1 wherein the flasher is bent or formed angularly into a spiral comprising a sequence of integral, angularly arranged, substantially flat surfaced segments.

4. The lure assembly of claim 1 wherein the degree of spiral of the flasher viewed endwise, is from 45 to 720 degrees.

5. The lure assembly of claim 1 wherein the degree of spiral of the flasher viewed endwise, is from 90 to 360 degrees.

6. The lure assembly of claim 1 wherein the spiral of the flasher is continuous and to a degree when viewed endwise of from 90 to 360 degrees.

7. The lure assembly of claim 1 wherein the elongated flat unit of structural material comprises a metal plate having a highly reflective surface.

8. The lure assembly of claim 1 wherein the flasher includes a lamina of highly reflective material adherently united in selected locations on the surface of the unit.

9. The lure assembly of claim 8 wherein the lamina comprises a metalized plastic film.

* * * * *